United States Patent [19]

Green

[11] 4,404,822
[45] Sep. 20, 1983

[54] PRE-COILED CABLE-LOCK DEVICE

[76] Inventor: Leonard O. Green, 922 S. Birch St., Santa Ana, Calif. 92701

[21] Appl. No.: 265,041

[22] Filed: May 18, 1981

[51] Int. Cl.³ .................. B62H 5/00; E05B 71/00; E05B 73/00
[52] U.S. Cl. .................................. 70/233; 70/18; 70/49; 224/31; 242/84.8
[58] Field of Search .............. 70/234, 233, 225–227, 70/18, 15, 49, 58, 63, 232, 52, 53; 248/551–553; 280/289 L–289 A; 224/32 R, 31, 30 R; 242/84.8; 24/223

[56] References Cited

U.S. PATENT DOCUMENTS

| | | | |
|---|---|---|---|
| 2,180,117 | 11/1939 | Lipsis | 70/234 X |
| 2,574,967 | 11/1951 | Gossner | 70/49 |
| 3,335,585 | 8/1967 | Stratton | 70/58 |
| 3,756,008 | 9/1973 | Smith | 70/18 X |
| 3,772,645 | 11/1973 | Odenz et al. | 70/234 X |
| 3,905,214 | 9/1975 | Bell | 70/18 X |
| 4,012,930 | 3/1977 | Benson | 70/234 |
| 4,057,983 | 11/1977 | Morgan | 70/18 |
| 4,070,879 | 1/1978 | Thompson | 70/49 X |
| 4,186,576 | 2/1980 | Means et al. | 70/233 |
| 4,188,808 | 2/1980 | Valdez | 70/233 |

FOREIGN PATENT DOCUMENTS

| | | | |
|---|---|---|---|
| 132445 | 7/1902 | Fed. Rep. of Germany | 70/233 |
| 205278 | 12/1908 | Fed. Rep. of Germany | 70/226 |
| 2807650 | 8/1979 | Fed. Rep. of Germany | 70/49 |
| 238520 | 5/1946 | Switzerland | 70/233 |
| 9747 | of 1897 | United Kingdom | 70/227 |
| 124227 | 3/1919 | United Kingdom | 70/227 |

*Primary Examiner*—Richard E. Moore
*Assistant Examiner*—Carl F. Pietruszka
*Attorney, Agent, or Firm*—Francis X. LoJacono

[57] ABSTRACT

A pre-coiled cable-lock device for use with a motorcycle and other like vehicles, wherein the device comprises a housing having a drum-like compartment in which an elongated precoiled cable is stored. The housing includes a securing member for attaching the housing to a suitable frame member of the motorcycle. One end of the cable is fixedly secured within the compartment, and the opposite free end is provided with a keeper member arranged to be received in and form part of the housing wall when in a stored mode, the keeper being held therein by a locking front plate. When in a cable-locking mode, the cable is looped in a suitable manner to a fixed structure or through one wheel, the keeper member being reinserted into the housing wall and again held in place by the locking plate, thereby preventing the removal of the keeper member.

7 Claims, 7 Drawing Figures

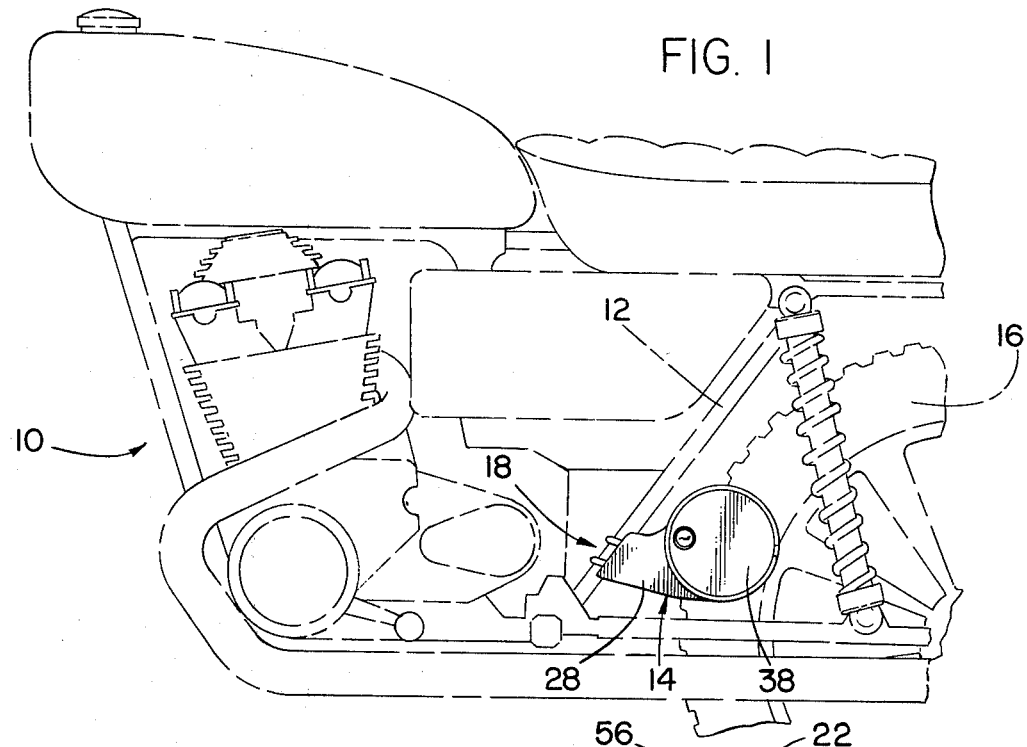
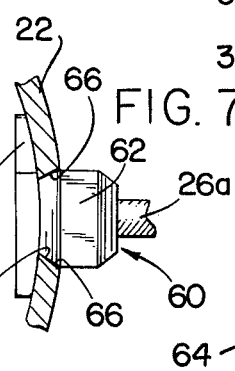
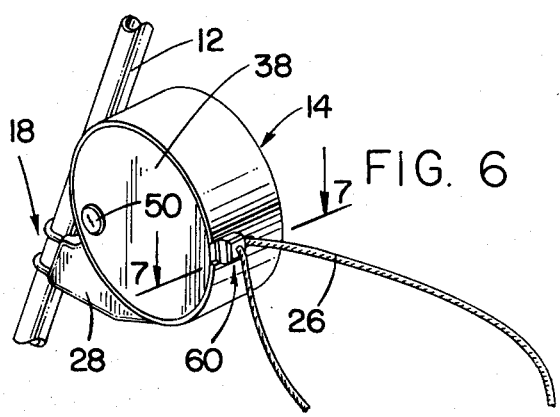
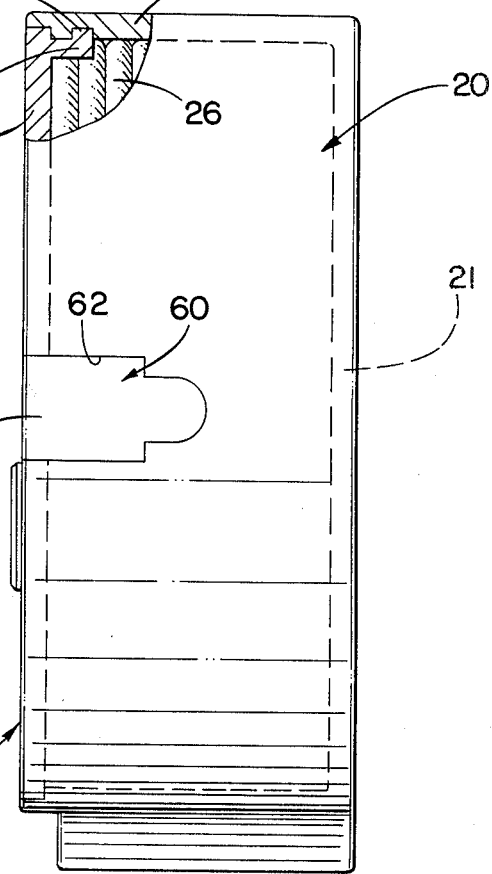

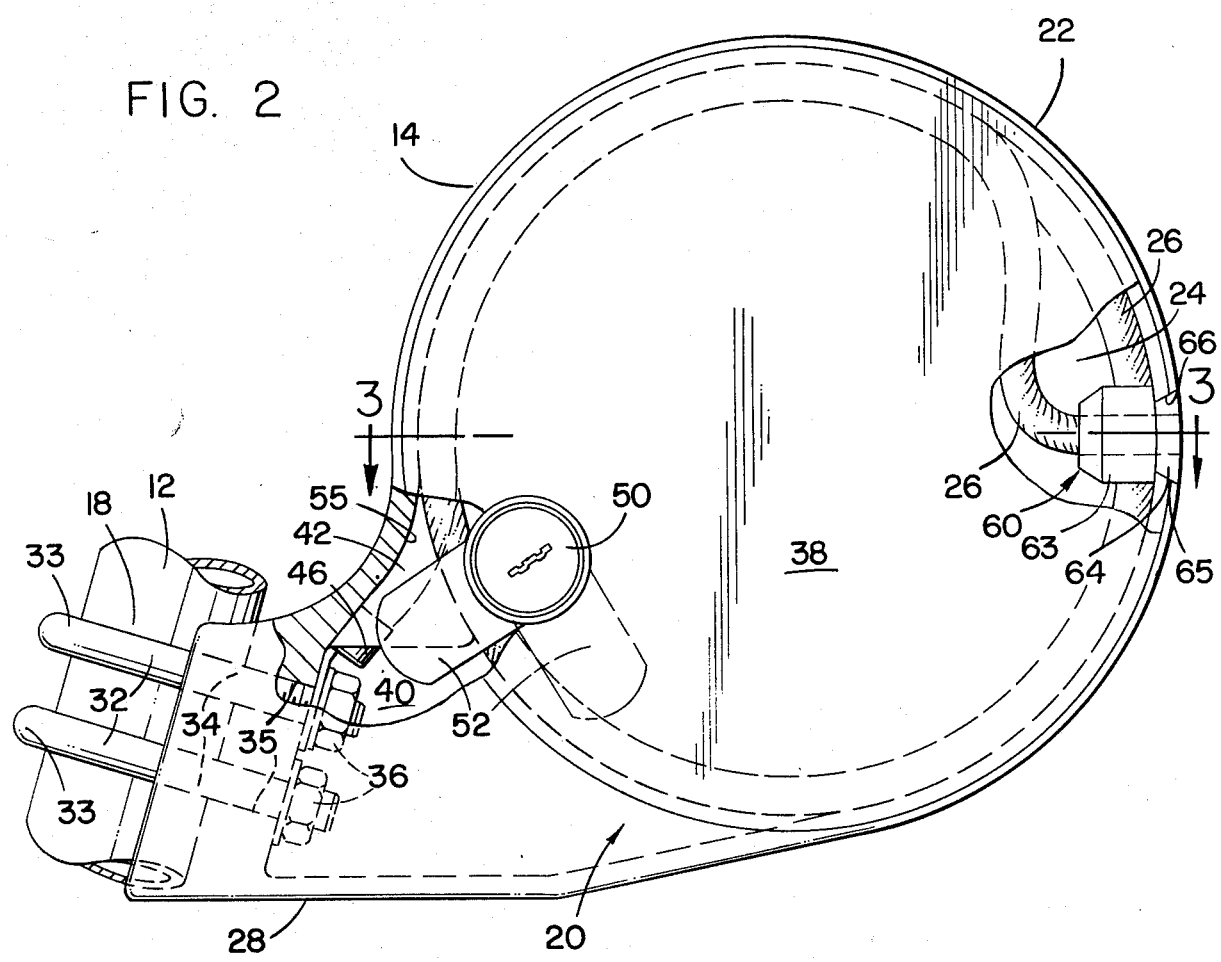
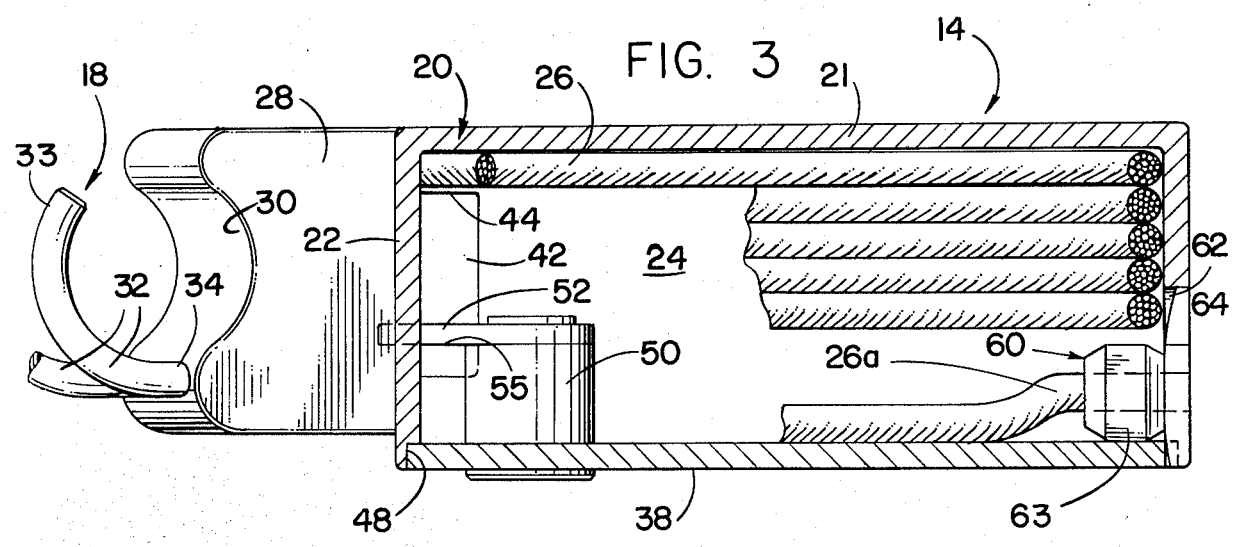

PRE-COILED CABLE-LOCK DEVICE

BACKGROUND OF THE INVENTION

1. Field of the Invention

This invention relates to a lock device for vehicles, and more particularly to a pre-coiled cable-lock device for two-wheeled vehicles such as motorcycles and bicycles.

2. Description of the Prior Art

It is well known in the art that various problems and difficulties are being encountered in attempting to provide suitable locking or securing means for two-wheeled vehicles—particularly the motorcycle-type—in order to prevent such vehicles from being stolen.

Many types of locking devices have been invented, some of which have been in use but with varying operating success. Most of the known devices have inherent use restrictions; and they are complicated to operate and expensive because of the many operating parts that they require.

As an example, the lock of U.S. Pat. No. 3,906,758 discloses a cable wound onto a spring-loaded reel which includes a ratchet wheel and a pawl which is arranged to engage the ratchet wheel. The cable is secured at one end to the reel and is provided at its opposite free end with a separable combination lock.

Another example is U.S. Pat. No. 3,990,279 which comprises a locking apparatus having a cable secured to a spring-loaded reel at a point between the ends of the cable, thereby allowing the ends to be payed out or reeled in. The ends of the cable are designed so as to be secured to one another by a suitable lock.

Still another example is U.S. Pat. No. 4,037,441 which discloses a bicycle lock that includes a cable supported on a reel which is also provided with a coil-spring drive for retraction of the cable, the cable having a lock on one end and the other end portion wound around the reel.

U.S. Pat. No. 4,126,024 is still another example of the typical cable-lock device that includes a spring-loaded reel, the spring providing a constant load on the cable. The free ends of the cable are provided with loops which are of sufficient size to be maintained outside of the housing, so as to be secured by a padlock.

As a further example of locking devices for two-wheeled vehicles, U.S. Pat. No. 4,112,720 incorporates a lock assembly which also includes a cable supported by a spring-loaded reel.

It should be noted that all of the above-mentioned patents provide various types of spring-loaded reels and include numerous cooperating working elements.

The present invention is so arranged as to overcome the foregoing deficiencies by eliminating the spring-loaded reel and providing in place thereof a pre-coiled cable having no related operating elements.

SUMMARY OF THE INVENTION

This invention is a pre-coiled cable-lock device for motorcycles and other two-wheeled vehicles, the device including a single housing structure having a drum-like compartment wherein a pre-coiled cable is protectively stored and secured by a locking plate. The housing is permanently mounted to the motorcycle-frame structure, preferably adjacent the rear wheel, by a pair of clamp members which are accessible only through the drum compartment formed in the housing.

The pre-coiled cable is wound in a coil so as to be readily received in the storage compartment, one end of the cable being affixed therein and the opposite free end being provided with a reversible keeper member. When in a stored mode, the keeper member is fitted into the annular wall of the housing and is also locked into position by the locking plate that covers the compartment, the locking plate being provided with a suitable lock to engage the housing within the protective area of the compartment. The cable may have a sufficient length so as to be withdrawn from the compartment of the housing, and then looped about a fixed structure or between the spokes of the adjacent wheel. The reversible keeper is then reinserted in a reverse manner into an appropriate matching slot formed in the annular wall of the housing, and locked in place by replacing the locking plate over the compartment. Thus, the cable cannot be removed unless the locking plate is removed.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 illustrates a side-elevational view of a portion of a motorcycle having the present lock device attached to the frame structure thereof adjacent the rear wheel of the motorcycle;

FIG. 2 is an enlarged side-elevational view of the lock device with portions thereof broken away to more clearly illustrate the cable connections and the locking arrangement thereof;

FIG. 3 is a cross-sectional view taken substantially along line 3—3 of FIG. 2;

FIG. 4 is an end view of the housing showing the coiled cable stored in the locked compartment and the keeper mounted in the annular wall thereof;

FIG. 5 is a rear view of the keeper member;

FIG. 6 is a pictorial view of the present invention showing the cable looped and hooked back into the housing; and FIG. 7 is an enlarged cross-sectional view taken substantially along line 7—7 of FIG. 6.

DETAILED DESCRIPTION OF THE INVENTION

Referring more particularly to FIG. 1, there is shown a portion of a motorcycle, generally indicated at 10, which includes a typical frame structure having a structural bar 12. The motorcycle lock device 14 is shown fixedly secured to bar 12 adjacent the rear wheel 16 by securing means 18, more readily illustrated in the enlarged view of FIG. 2.

The pre-coiled cable-lock device comprises a housing 20 having a rear wall 21 and an annular wall 22 which defines a drum-like storage compartment 24 adapted to suitably receive a pre-coiled cable 26 therein. The housing is further formed having a projecting neck member 28 which is arranged to engage the tubular bar 12 of the motorcycle-frame structure. That is, neck member 28 is formed having an arcuate channel 30 so as to cooperate with bar 12 and the securing means 18, whereby the housing is fixedly attached adjacent the rear wheel 16.

The securing means is so arranged with the housing that, once the housing is attached to the frame structure, one would require a key to have access for the removal of the securing means. To effect such an arrangement, securing means 18 comprises a pair of hook bolts 32, each having a hook end 33 that clamps around bar 12 and a stud end 34 which is received through respective bores 35. The stud end is threaded to receive nut 36. Thus, it can be seen in FIG. 2 that the housing cover or plate 38 must be removed in order to attach or remove the nuts from the bolts. Neck member 28 is formed having a recess 40 wherein the threaded ends of the hook bolts terminate without interference from cable 26. Cable 26 is pre-coiled so as to assume the same general diameter as the inside diameter of compartment 24.

Because of the recess 40, a projecting lip 42 is formed above the recess wherein a groove 44 is provided to allow the end of the cable to be attached to one of the hook bolts. An attaching means is established by bolt 32, nut 36 and eye lug 46, which is secured to one end of cable 26.

Accordingly, the pre-coiled cable 26 is attached at lug 46, which cannot be reached as long as cover 38 is locked in place. Cover 38 is adapted to fit within the annular recess 48 formed along the inner edge of wall 22. The cover is provided with a locking means which comprises a suitable lock 50 having a lock tongue 52 and a catch member 54. The lock is so positioned on cover 38 that tongue 52 can be readily actuated to be received in slot 55; and catch member 54 (seen in FIG. 4) is located somewhat oppositely from the lock and arranged to be caught within groove 56 formed in the inner surface of wall 22. Hence, when lock tongue 52 is positioned in slot 55 of lip 42, and catch member 54 is in groove 56, cover 38 cannot be removed.

Cable 26 is further provided with a keeper means 60 which is secured to the free end 26a of the cable. When cable 26 is in a stored mode, keeper means 60 is adapted to be fitted into a formed slot 62 disposed in the annular wall 22. The configuration of keeper means 60 is such that in this mode slot 62 is completely closed, thus forming the smooth outer surface of wall 22.

The configuration of keeper means 60 comprises a main body 63 and a transversely arranged keeper arm 64 having beveled edges 65 to correspond to the matching beveled edges 66 of slot 62. To remove keeper means 60, the cover 38 is unlocked and removed, allowing the keeper to be removed from slot 62. The pre-coiled cable is stretched out and looped, as seen in FIG. 6. The cable can be looped about a fixed structure, or it can be suitably looped through wheel 16 and reattached to wall 22. That is, keeper 60 is secured in slot 62 by positioning keeper arm 64 on the inside of wall 22, and the body 62 on the outside thereof. This arrangement can be seen in FIGS. 6 and 7. Cover 38 is then again locked into position over compartment 24 so that the keeper arm is prevented from being moved, and thus keeper 60 is locked to the housing 20.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A lock device for two-wheel vehicles, comprising:
    a housing having an annular wall including receiving means, and a rear wall defining a drum-like compartment;
    a projecting neck member integrally formed as part of said housing and adapted to be fixedly secured to the frame structure of the two-wheeled vehicle;
    means attached to said neck member for securing said housing to said frame structure adjacent at least one of the wheels thereof;
    a pre-coiled cable for storage in said drum-like compartment and having sufficient length to form an enlarged loop when extended from said compartment, one end of said pre-coiled cable being fixedly secured within said compartment and the opposite free end thereof being removably mounted within said receiving means of said annular wall;
    keeper means attached to said free end of said cable and adapted to be removably mounted within said annular wall;
    a removable cover adapted to be lockably secured to said housing, in order to cover said compartment; and
    locking means mounted to said cover for locking said cover to said housing.

2. A lock device as recited in claim 1, wherein said receiving means comprises a slot within said annular wall to receive said keeper means when said cable is either in a stored mode or in an extended locked mode.

3. A lock device as recited in claim 2, wherein said keeper means comprises:
    a main body member having a plurality of beveled sides;
    and
    an extended keeper-arm member on the end of said body formed to be positioned in said slot of said wall when said cable is in a stored mode and positioned within said compartment in a locked mode, whereby said wall is interposed between the keeper arm and said main body and is prevented from removal therefrom, as long as said cover is mounted in a locked position on said housing.

4. A lock device as recited in claim 3, wherein said securing means comprises at least one hook bolt and a matching nut, the hook end thereof being positioned to engage the frame structure of said vehicle and said nut being positioned within said compartment, and wherein said secured end of said cable is attached to at least one hook bolt.

5. A lock device as recited in claim 4, wherein said securing means comprises a pair of hook bolts, and wherein said locking means for said cover comprises:
    a key lock having a lock tongue to engage said housing in a locked position;
    a catch means formed along the edge of said cover for engagement with said housing; and
    a groove formed in said annular wall to receive said catch means therein.

6. A lock device as recited in claim 4, wherein said neck member includes an arcuate channel formed therein, whereby a member of said frame structure is clamped between said channel and said hook bolts.

7. A lock device as recited in claim 4, wherein said slot in said wall includes beveled edges to match said beveled sides of said keeper means.

* * * * *